United States Patent [19]

Sawada et al.

[11] 4,361,399

[45] Nov. 30, 1982

[54] APPARATUS FOR RELEASING A SHEET-REGISTRATION MECHANISM

[75] Inventors: Takamasa Sawada, Yokohama; Akiyoshi Torigai, Machida; Teruo Morikawa, Sagamihara, all of Japan

[73] Assignee: Canon Kabushiki Kaisha, Tokyo, Japan

[21] Appl. No.: 201,535

[22] Filed: Oct. 28, 1980

[30] Foreign Application Priority Data

Nov. 8, 1979 [JP] Japan ................................ 54-144723

[51] Int. Cl.³ .......................... G03B 27/62; B65H 9/04

[52] U.S. Cl. ...................................... 355/75; 271/242; 271/274

[58] Field of Search ................ 355/14 SH, 50, 51, 75; 271/242, 273, 274

[56] References Cited

U.S. PATENT DOCUMENTS

| | | | |
|---|---|---|---|
| 2,974,952 | 3/1961 | Zeuthen | 271/242 |
| 3,547,536 | 12/1970 | Phelps et al. | 355/50 |
| 3,661,383 | 5/1972 | Morrison | 271/273 |

*Primary Examiner*—Richard A. Wintercorn
*Attorney, Agent, or Firm*—Fitzpatrick, Cella, Harper & Scinto

[57] ABSTRACT

An apparatus for releasing a sheet-registration mechanism, including primary and secondary register members which cooperates with each other for registering a projected image of an original with a sheet being fed, and an openable cover member located at such a position that is spaced laterally from an apparatus for cooperating with the secondary register member to release the nip between the primary and secondary register members.

4 Claims, 5 Drawing Figures

APPARATUS FOR RELEASING A SHEET-REGISTRATION MECHANISM

BACKGROUND OF THE INVENTION

1. Field of the Invention

This invention relates to an apparatus for releasing a sheet-registration mechanism, particularly by which the sheet-registration mechanism can be returned to its exact original position after it has been released.

2. Description of the Prior Art

In general, the sheet-registration mechanism is located in a sheet-feeding path, for example, of a copying machine for registering a fed sheet with an image on the photoreceptive drum of the copying machine. Such sheet-registration mechanism requires precise accuracy with respect to its position. If it is not precisely positioned in the sheet-feeding path, sheets tend to be fed on a slant resulting in inconvenient situations such as jamming. In the prior art, accordingly, the sheet-registration mechanism included components such as register rollers and the like which are fixed on the machines.

In such an arrangement, however, when a sheet or sheets are jammed near the register rollers, particularly between the register rollers, it is very difficult to remove the sheet or sheets therefrom. Even if the sheet or sheets are forceably removed, any torn piece thereof may be left between the register rollers resulting in an increased difficulty.

In the prior art machines, the following procedure is taken to remove the sheet or sheets from between the register rollers. An outside cover is first unlocked and opened and then the register rollers are separated away from each other to release any pressure therebetween. After the jammed sheet or sheets have been removed, the register rollers are again set at their precise positions. Thereafter, the outside cover is closed and locked for initiating the conveyance of new sheets. This procedure in the prior art is very troublesome because it requires two independent operations, one for setting the register rollers in position and one for locking the outside cover.

SUMMARY OF THE INVENTION

In view of the above problems, this invention provides a novel and improved apparatus for releasing the sheet-registration mechanism.

It is an object of this invention to provide an apparatus for releasing the sheet-registration mechanism in which any sheet jammed between the register rollers can be readily removed.

Another object is to provide an apparatus for releasing the sheet-registration mechanism in which said mechanism cna be returned back to its exact original position after it has been released.

Still another object is to provide an apparatus for releasing the sheet-registration mechanism which includes an outside-cover locking mechanism for locking the register rollers as well as the outside cover in position in a coincident manner.

In one aspect of this invention, the releasing apparatus includes an openable side cover in the machine having register rollers which are located in a sheet-feeding path for registering a fed sheet with a projected image of an original. The driven rollers of the register rollers are mounted on the openable side cover.

In another aspect of this invention, the releasing apparatus includes an outside-cover locking mechanism by which the shaft of the driven register rollers mounted on an openable outside cover is engaged with said machine and in which the outside cover is locked on said machine by means of a member for urging the register rollers against each other.

DESCRIPTION OF THE PREFERRED EMBODIMENTS

Figure 1:
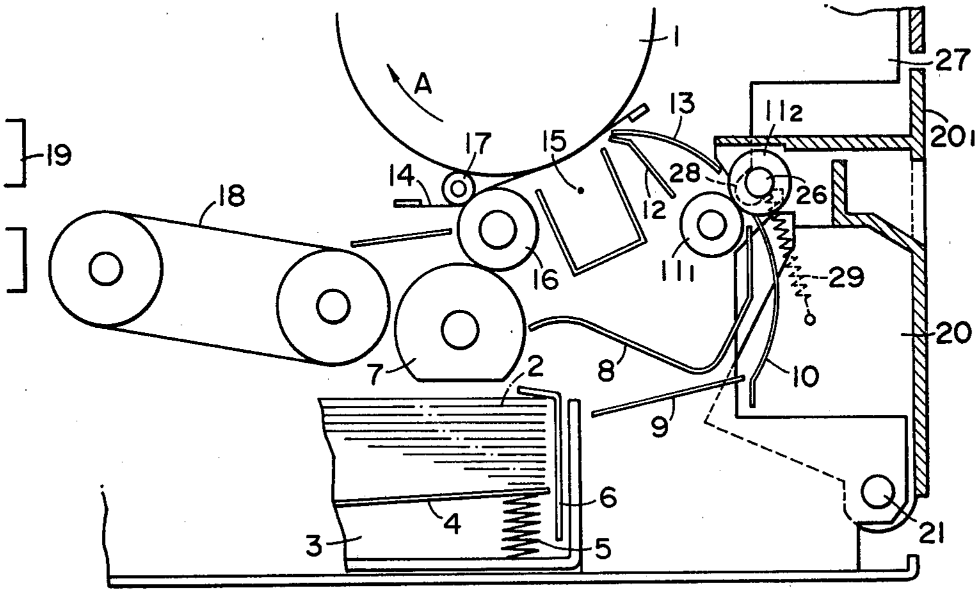
FIG. 1 is a longitudinal section of the main part of the sheet-feeding mechanism in a copying machine to which this invention is applied.

A copying machine to which this invention is applied will now be described in detail in connection with the drawings. FIG. 1 is a longitudinal section showing the main part of the sheet-feeding mechanism of the above copying machine. The copying machine comprises a photosensitive drum 1 rotated at a constant speed in a direction as shown by an arrow A. The photosensitive drum includes a photosensitive layer such as a photoconductive layer which is disposed over the periphery thereof. Around the photosensitive drum are normally located a latent-image forming means, a developing means, a transfer means and a cleaning means for removing the remaining toner.

Sheets 2, which are fed in synchronism with images on the photosensitive drum 1, are stacked on an inner plate 4 within a cassette 3 which is mounted in the lower portion of the copying machine. The inner plate 4 is urged upward by means of a spring 5. The uppermost sheet in the stacked sheets is always maintained at a predetermined level be means of a sheet separating pawl 6. Each of the sheets 2 is fed out of the cassette 3 by a rotating pickup roller 7 part of which is cut out at each revolution. However, the sheet 2 is only moved by a predetermined distance by means of the pickup roller 7. The fed-out sheet 2 is guided by stationary guide plates 8, 9 and a movable guide plate 10 to the nip between register rollers $\mathbf{11_1}$, $\mathbf{11_2}$. When the leading edge of the fed sheet impinges against the register rollers $\mathbf{11_1}$ and $\mathbf{11_2}$, the sheet is temporally stopped therein to correct the position thereof for preventing the slanted movement. When the register rollers $\mathbf{11_1}$, $\mathbf{11_2}$ are initiated to rotate, the sheet is moved to the photosensitive drum 1 through guide plates 12 and 13.

Adjacent the photosensitive drum 1 is located a separating belt 14 by which the sheet is separated from the photosensitive drum 1. In such a situation, the separated sheet 2 is charged by an electric potential from a corona discharging device 15 so that any toner image on the photosensitive drum 1 will be transferred to the sheet 2. After the transfer has been completed, the leading edge of the sheet is guided into the nip between a separating roller 16 and separating rolls 17 by means of the separating belt 14. Thereafter, the sheet 2 is moved to a fixing station 19 by a conveyer belt 18 having a suction mechanism. The separating belt 14 has an aperture $\mathbf{14_1}$ (FIG. 3) through which the separating rolls 17 is passed to engage with the separating roller 16 under pressure.

In order to remove any jammed sheet, the copying machine comprises a side cover 20 which is pivotally mounted around a fixed shaft 21 to open and close. On the side cover 20 are mounted integrally or operatively the driven register rollers $11_2$ and the movable guide plate 10. Accordingly, when the side cover 20 is opened by pulling out a grasping portion $20_1$, the driven register rollers 11B and movable guide plate 10 also are moved outward therewith.

A mechanism which is operatively associated with the above separating means will now be described in connection with FIGS. 2 and 3. Each separating roll 17 is rotatably mounted on one end of a roll support 22 which is swingably mounted on a fixed shaft 23 in each side of the machine. The roll support 22 includes a compression spring 24 housed therewithin at the other end of the roll support 22. The outer end of the compression spring 24 is adapted to engage with a slant portion $20_2$ in the side cover 20. Under the compressive force of the spring 24, therefore, the separating roll 17 is normally urged toward the separating roller 16.

Figure 2:
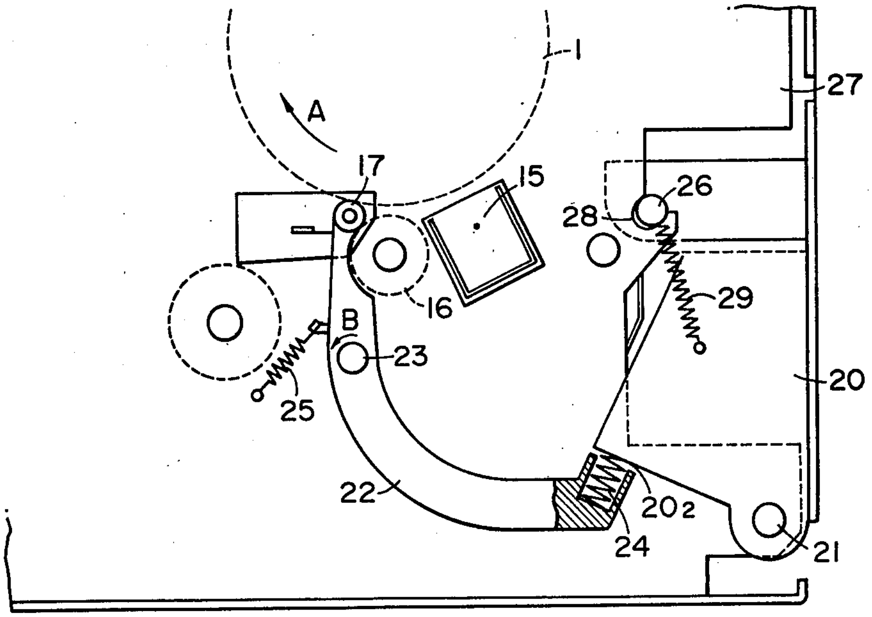
FIGS. 2 and 3 are sectional and plan views showing a sheet-registration mechanism.
Figure 3:
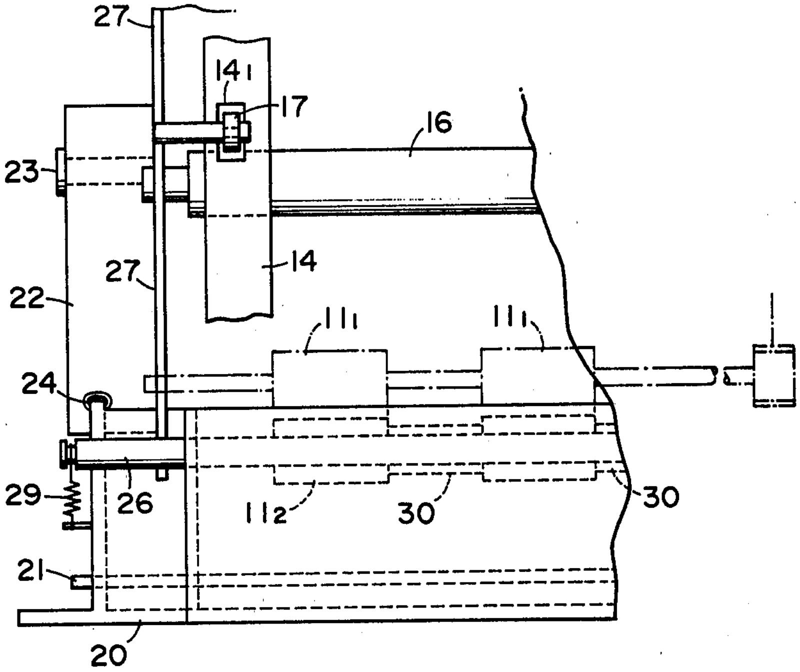

When the side cover 20 is pivoted outward around the shaft 21, the slant portion $20_2$ thereof is separated from the compression spring 24 to release it so that the roll support 22 can be swung in such a direction as shown by an arrow B in FIG. 2 under the influence of a tension spring 25 which is attached to the upper portion of the roll support 22. As a result, the separating roll 17 is moved away from the separating roller 16. It is noted that the tension spring 25 must have a force smaller than that of the compression spring 24.

Thus, any jammed sheet can be readily removed from between the register rollers or the separating rollers when the side cover 20 is moved outward from the machine. When the side cover 20 is closed, the driven register rollers $11_2$ are engaged by the driving register rollers $11_1$ under pressure. At the same time, the slant portion $20_2$ of the side cover 20 engages with the compression springs 24 so that the roll supports 22 are swung around the fixed shafts 23 against the tension springs 25 to engage the separating rolls 17 with the separating roller 16 under pressure.

The side cover 20 can be locked by engaging the shaft 26 of the driven register rollers $11_2$ in grooves 28 which are provided in the sidewalls 27 of the machine. The shaft 26 has at the opposite ends tension springs 29 for urging the driven register rollers 11B toward the driving register rollers 11A. These tension springs 29 also serve as means for assisting the shaft 26 in engaging with the grooves 28 of the sidewalls 27.

The driven register rollers $11_2$ are rotatably mounted around the shaft 26 to attain their free rotation. In such a case, a spacer 30 is located between adjacent rollers to prevent the rollers from moving in the axial direction.

Figure 4:
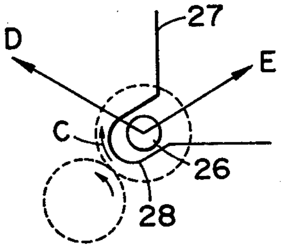
FIGS. 4 and 5 are enlarged illustrations of groove portions.
Figure 5:
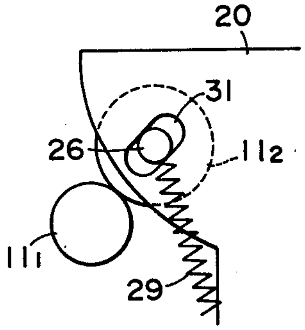

Referring to FIG. 4, the driven register rollers $11_2$ are rotated in a direction as shown by an arrow C so that the shaft 26 will be urged in the grooves 28 in such a direction as shown by an arrow D to be firmly held in the grooves 28. When the side cover 20 is opened, the shaft 26 is moved outward from the grooves 28 as shown by an arrow E so that the side cover will not be prevented from opening. Furthermore, it is preferred that the shaft 26 is received at each end by an elongated aperture 31 in the side cover 20 as shown in FIG. 5. Thus, the shaft 26 can be more readily moved outward from the grooves 28 of the machine sidewalls 27 when the side cover 20 is opened, and the driven register rollers $11_2$ can be more positively engaged by the driving register rollers $11_1$ under pressure.

As described hereinbefore, this invention provides a novel and improved releasing apparatus including driving register rollers which are journalled by the sidewalls of the machine, and driven register rollers positioned by grooves in the same sidewalls which serve as members for supporting the photosensitive drum, so that the driven register rollers can be precisely returned to their original positions with respect to the photosensitive drum after they are separated from the driving register rollers to remove therebetween any jammed sheet.

The side cover also serves as a locking mechanism for the rotating center and the side cover so that the movable sheet-guiding plate on the side cover will also be returned to its exact original position to effect stable sheet-feeding. The side cover need not have any other locking mechanism.

What we claim is:

1. In an apparatus for releasing and re-positioning a sheet-registration mechanism, comprising primary and secondary register members which cooperate with each other for registering a projected image of an original with a sheet being fed, and an openable cover member located at a position spaced laterally from said apparatus for cooperating with said secondary register member to release the nip between said primary and secondary register members, the improvement wherein said primary register member includes at least one driving register roller, and said secondary register member includes at least one driven register roller, and wherein said driven register roller includes a shaft which is engaged with said apparatus, and further including a locking mechanism for causing a member which urges said driven register roller under pressure to lock said cover member.

2. In an apparatus provided with a sheet transportation path, and having a cover operably mounted on a body portion of the apparatus, and first and second rollers for transporting a sheet along the transportation path, an improvement comprising means for mounting said first roller on said body; a shaft mounted on said cover for supporting said second roller; and engaging means provided on said body, for engaging said shaft when said cover is closed, to urge said second roller into cooperative contact with said first roller.

3. An apparatus according to claim 2, wherein said engaging means comprises means for resiliently locking said shaft in its said cooperative position.

4. An apparatus according to claim 2, wherein said first and second rollers comprise register rollers for transporting the sheets in accordance with a predetermined timing.

* * * * *